CHRIS K. HANSEN INVENTOR

BY Alton V. Oberholtzer

ATTORNEY

United States Patent Office 3,079,190
Patented Feb. 26, 1963

3,079,190
PLANT HUSBANDRY AND APPARATUS
THEREFOR
Chris K. Hansen, 2657 Geranium Ave., St. Paul, Minn.
Filed Mar. 22, 1957, Ser. No. 647,859
4 Claims. (Cl. 294—50.7)

This invention relates to an improvement in plant husbandry and more particularly to a new and useful improvement in the method of digging, keeping and transplanting trees, shrubbery and perennial plants and structure therefor.

Conventionally, in transplanting trees, shrubbery and perennial plants they are dug up with a ball of earth surrounding the roots. The roots, with what earth that does not fall off, are encased in burlap, tar paper, tin cans, paper bags, and clay pots. Generally, in the digging, packaging or replanting process, the principal feed roots become exposed to the air unless special care is taken to guard against the dirt breaking loose. In addition the conventional practice is to get the tree or plant being transplanted, replanted as quickly as possible in the quickest time possible. As is well known, trees and shrubbery are kept for only relatively short periods of time when burlapped and to be kept from season to season are destroyed or must be replanted and reburlapped for transplanting. In adition, small plants potted or packaged in tin cans, tar paper and paper bags are removed from the packaging for planting with resultant danger of exposure of the roots to air which damages or retards growth. Generally, there is also the problem of digging a hole in the ground and the usual dirt pile with its disfiguring and clean up problems which are generally left to nature to obliterate.

Accordingly it is an object of this improvement in plant husbandry to provide for a simplified method of digging trees, shrubbery and perennial plants from the ground, in any season so long as the ground is not frozen, with a ball of dirt about the roots, transferring the roots and ball of dirt with the digging tool directly into a decomposable veneer shell, removing the digging tool and closing the veneer shell about the ball of dirt for holding the roots indefinitely and transplanting with the dirt directly into the earth.

Another object of this improvement in plant husbandry is to provide for a simplified method of transplanting trees, shrubbery and perennial plants by enclosing the plant roots and jointed earth with a lifting tool driven into the earth about the growing roots, transferring the lifting tool with the roots and dirt into the shell of a veneer frame, removing the tool and tying the veneer frame about the dirt and the roots, then replanting upon digging a new hole by removing, in one operation, a ball of dirt with a herein disclosed digging and lifting tool and planting the veneer shell with the enclosed dirt and roots in the new hole.

An additional object of this improvement in plant husbandry is to provide a digging and lifting tool having two opposite substantially equal separable semi-circular sides to be independently driven into the ground for enclosing a ball of dirt about the roots of a tree, shrub or perennial plant and hooked together for twisting, loosening and lifting the ball of dirt enclosing the roots.

Further objects and advantages will be apparent from the following description of the accompanying drawings wherein.

It is well known in the art of plant husbandry that transplanted trees, shrubs and plants are not expected to take hold and grow normally for a period of about a year after being replanted. Particularly is this true of flowering plants wherein it is understood that they do not normally flower during the first season after transplanting and if they do, the flowering is exceptional. In such instances the growths have been made in a portable package for direct transfer from the growth in the package to the ground. However, in growing trees, shrubbery and perennial plants in a nursery the ground is usually the growing place and for transplanting, the growing roots must be dug up, carried about or held for sale and subsequently replanted where desired. The retention of a ball of dirt about the roots is of critical importance for assuring proper life and growing characteristics. In nursery, the trees, shrubbery and perennial plants are usually grown in rows relatively close together and in cultivated or preferably well kept soil wherein the root growths form a close compact or grouped bundle that can be dug up and lifted from theg round for tying in burlap, or as is the present practice wrapped in tar paper. The burlap rots easily and does not retain moisture. The tar paper holds water, but should be removed before replanting the roots. The digging is usually done by spade and shovel work.

In contrast to such spade and shovel work with subsequent wrapping there is herein provided a digging tool A which encases the roots in a ball of dirt and provides an arrangement for lifting the dirt ball and roots together without danger of separation of the dirt from the roots while encasing the dirt and roots in a veener shell, as described in my divisional application Serial No. 199,212, filled May 16, 1962, which lasts for a long period in an exposed state and deteriorates rapidly when buried in the ground.

The digging and lifting tool A is formed by shaping a pair of shovel steel blades 11 and 12 into semi-circular form. These semi-circular blades 11 and 12 join together in separable relationship to provide a substantially ring shaped circular enclosure as illustrated in FIGURES 1 and 3, and in the manner as hereinafter described.

Figures 1, 2:
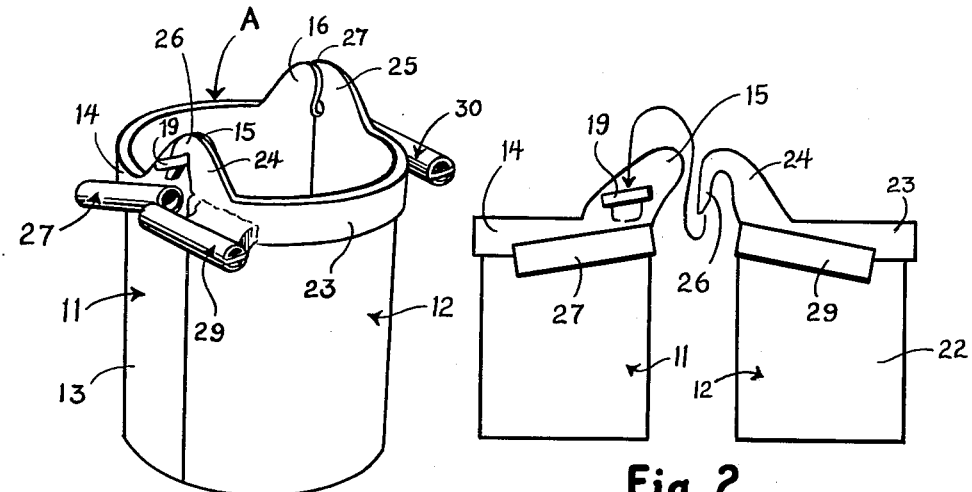
FIG. 1 is a perspective of my tree shrub and plant root digging and lifting tool.
FIG. 2 is a side plan view of the tool shown in FIGURE 1 with the sides in separated relationship.
Figures 3, 4:
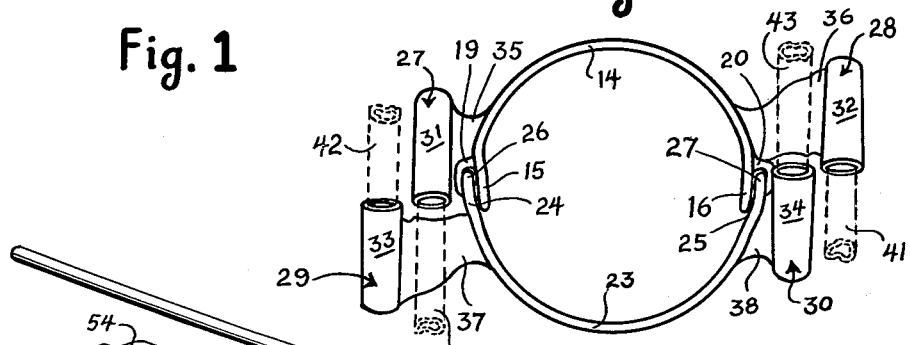
FIG. 3 is a top plan view illustrating the manner in which the handles are cooperatively attached to the tool shown in FIGURE 1.
FIG. 4 is a perspective of one of the handles.

Considering FIGURE 1 in conjunction with FIGURES 2 and 3, the blade 11 has a thin semi-circular lower plate section 13 provided with a relative semi-circular thicker upper rim section 14. The upper rim section 14 is a hardened steel which will withstand hammering without objectional mushrooming and splitting. Each end of the rim section 14 is provided with upstanding and forwardly extending ears 15 and 16. Each ear 15 and 16 is bent inwardly at a slight angle, as shown in FIGURE 3, from the semi-circular body shape of the rim section 14 to provide end guides for relative positioning of the blade 12 into pivotal interlocking relationship with blade 11. Eyelets 19 and 20 are cast or spot welded to extend outwardly and angularly to the ears 15 and 16, respectively.

The blade 12 also has thin semi-circular lower plate section 22 provided with a relative semi-circular thicker upper rim section 23 of hardened steel which will withstand hammering without objectionable mushrooming, flattening and splitting when pounded into the ground. Each end of the rim section 23 is provided with the upwardly and forwardly extending ears 24 and 25 provided with hook ends 26 and 27, respectively, which are adapted to be engaged in and disengaged from eyelets 19 and 20, respectively. As more clearly illustrated in FIGURE 3, the upwardly and forwardly extending ears 24 and 25 are bent outwardly and extend forwardly in a slightly offset angle to the normal or main body circumference of rim 23.

Secured adjacent each end of the rim portions 14 and 23 are pairs of tubular sockets 27, 28 and 29, 30, respectively. Each of the sockets 27, 28 and 29, 30 are formed of elongated tubular pipe sections 31, 32 and 33, 34, respectively, spot welded to or formed as integral parts of bracket arms 35, 36 and 37, 38, respectively. The arms 35, 36 and 37, 38 are integral with or joined to the ends of rim portions 14 and 23, respectively, by spot welding, riveting or other suitable fastenings. While it may be possible to change the configuration of the attaching bracket arms 35, 36 and 37, 38, it is preferred to arrange the sockets 27 and 30 on opposite sides and facing in opposite directions, on the short bracket arms 35 and 38 and in relative close relationship to the respective opposite ends of the rim portions 14 and 23, respectively. Whereas the sockets 28 and 29 are faced in opposite directions on longer bracket arms 36 and 37 in relatively spaced relationship to the opposite ends of the rim portions 14 and 23, respectively. This positions the pairs of socket members 27, 28 and 29, 30 on the same relative planes of alignment and the adjacent members 27, 29 and 28, 30 having openings in adjacent opposite directions.

It will be recognized from FIGURES 1 and 2 in conjunction with FIGURE 3 that the brackets 35 and 36 mount the longitudinal length of the sockets 27 and 28 respectively, at a slightly tipped back angle to permit the easy entry of the ends of a pair of elongated rod handles 40 and 41, as represented by the rod or pole 40 (one only being shown in relative full length). The brackets 37 and 38 mount the sockets 29 and 30, respectively, also at a slightly tipped back angle to permit the easy entry of the ends of a pair of similar elongated rod handles 42 and 43. With the hook ends 26 and 27 caught in eyelets 19 and 20 and the rod elements 40, 41, 42 and 43 in the sockets 27, 29, 30 and 31, respectively, a lifting action on the said rod elements pivots and pulls the lower relatively squared ends of the shovel blades 11 and 12 together in slightly overlapping relationship for lifting a ball of dirt with the growing roots of a tree, shrub or plant that is to be transplanted.

As heretofore indicated, a nursery that cultivates tree growths for transplanting, plants the seedlings in spaced rows and in relatively close relationship to conserve ground space. When it is desired to dig up the tree or other growth, the blade side 11 is pounded or driven into the ground at one side of the tree or roots to partially encompass the roots thereof. Next the blade side 12, guided by the ears 15 and 16 is pounded or driven into the ground on the opposite side of the tree or plant roots and the hook ends 26 and 27 engage in the eyelets 19 and 20, respectively, with blades 11 and 12 encircling the growing roots and the soil in which they are embedded. Ordinarily the root growth is not extensive and the relative size and extent of root growth will ordinarily determine the diameter size of the blades 11 and 12.

Figure 5:
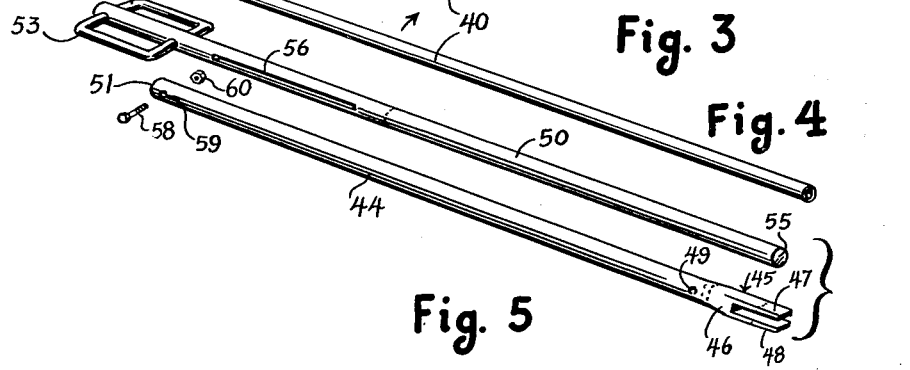
FIG. 5 is a perspective of the separate parts of a driving element for pounding the opposite sides of the digger tool into the ground to enclose a main root body of a tree, shrub or perennial plant.

In order to pound the blades 11 and 12 into the ground about a tree or plant roots there is preferably provided a pounding tool, as shown in FIGURE 5. This pounding tool consists of a hollow rod 44 having a bifurcated lower end 45 with a solid hammer portion 46 and the extended legs 47 and 48 which are adapted to be mounted on and slid around the semi-circular rim portions 14 and 23 of the semi-circular blades 11 and 12, respectively. A clean out hole 49 is preferably provided just above the solid hammer portion 46, for removal of dirt and water which may collect in the hollow portion of the rod 44. A solid rod 50 is adapted to be slid into the open upper end 51 of rod 44. Suitable handles 53 and 54 are provided on the upper end of rod 50, to facilitate raising and dropping the end 55 against the hammering portion 46 of rod 44. If desired, a slot 56 is provided near the upper end of rod 50 to serve as a keeper and guide for the bolt 58 which is adapted to be mounted through an aperture 59 near the upper end of rod 44. The head of bolt 58 and a suitable nut 60 serves to retain the rod 50 mounted in rod 44 and permits a relatively limited sliding relationship therebetween over the length of the slot 56. By positioning the hammer head 46 on and about the rims 14 and 23 and lifting and pounding end 55 against hammer head 46 no breakage of the tree or plant limbs and other foliage occurs.

Having driven the semi-circular blades 11 and 12 into their proper position, as described, and positioned rod elements 40, 41, 42 and 43 in the socket members 27, 28, 29 and 30, respectively, a team of two persons, one at each of the opposite outermost ends of the rod elements 40, 41 and 42, 43, simultaneously lift and rotate the blades with a clockwise or counterclockwise motion to break the ball of earth away from its base or juncture with the ground at a point about even with the lowermost edge of the embedded blades 11 and 12. Ordinarily after this lifting and rotary motion, a further lifting motion on the rod elements 40, 41 and 42, 43 lifts the ball of dirt and enclosed roots out of the ground without damage to either the roots or the foliage of the tree, shrub or plant being removed from its place of growth.

On occasion a heavy root may extend deeper in the ground. In that case it is necessary to either cause more rotation or otherwise manipulate the ball of earth to cut the root from thereunder. However, with trees and plants in nursery stock, this additional root growth is avoided and does not normally occur. When trees and other rooted plants are extracted after many years of growth the longer roots which may be cut by driving of blades 11 and 12 into the ground about the main root growth does not harm the transplanting thereof when the ball of earth is maintained thereabout in the manner as herein described.

In accordance with the patent statutes, I have described my improved method of transplanting trees, shrubbery and perennial plants and structure therefor, and while I have endeavored to set forth the best embodiment thereof, I desire to have it understood that changes may be made within the scope of the following claims without departing from the spirit of my improvement in the art.

I claim:

1. A digging and transplanting tool, for extracting the roots of rooted growing trees, shrubbery and plants from the ground in a solid dirt ball, comprising a saparable pair of semi-circular shovel blade sections, each of said shovel blade sections having lower semi-circular thin blade portions adapted to be independently driven into the ground in a relatively semi-circular relationship to form a closed circle about the said roots and dirt ball to be extracted, eyelet means on one of said shovel blade sections, hook means on the other of said shovel blade sections cooperable with said eyelet means, said eyelet means and said hook means being adapted to secure and hinge the said pair of shovel blade sections together in a circular rotatable relationship, and separable handle members substantially horizontally extending in crossed relationship and from the opposite upper sides of said blade sections to which they are attached and in disconnected relationship with the blade side from which the handles extend, whereby in a lifting action on said handles a lifting and pivotal movement on said blade sections can be effected to release the roots and dirt ball with the lower relative ends of the said shovel blade sections being pulled together in relative lifting relationship for extracting the roots and dirt ball from the ground.

2. For use in plant husbandry, a rotatable digging and transplanting tool for trees, shrubbery and perennial plants comprising in combination a pair of semi-circular shovel blades, each of said shovel blades having a lower semi-circular thin blade section adapted to be driven into the ground to partially encircle and together adapted to be rotated to cut, shape and lift a ball of dirt containing the principal root growth of said article to be transplanted, each of said shovel blades having upper reinforced rim sections adapted to be hammered for pounding said thin blade sections into the ground, one of said rim sections having forwardly and inwardly extending guides extending from the opposite ends thereof, eyelets extending from said rim and guides, the other of said rim sections having forwardly extending hooks extending from said other side of said rim sections and adapted to be engaged in hinge-like relationship with said eyelets, and removable handle members extending in opposite directions and crossed relationship from each of said rim sections for rotatably lifting an opposite one of said shovel blades with their lower edges substantially in overlapping relationship and to effect a relative clam action on said blades in a rotating and lifting operation therewith.

3. The structure of claim 2 wherein, each rim is provided with opposed facing socket members for removably mounting said handle members.

4. The structure of claim 3 wherein, the said socket members are arranged in pairs extending in opposed directions from near the opposite ends of each of said rim sections.

References Cited in the file of this patent

UNITED STATES PATENTS

| | | |
|---|---|---|
| 155,707 | Carroll | Oct. 6, 1874 |
| 383,629 | Coon | May 29, 1888 |
| 621,405 | Garrett | Mar. 21, 1899 |
| 652,195 | Sheppard | June 19, 1900 |
| 816,236 | Kline | Mar. 27, 1906 |
| 879,613 | Edwards | Feb. 18, 1908 |
| 1,117,844 | Helm | Nov. 17, 1914 |
| 1,129,924 | Von Hassel | Mar. 2, 1915 |
| 1,464,534 | Lovett | Aug. 14, 1923 |
| 2,243,955 | Gwathmey | June 3, 1941 |
| 2,367,889 | Radtke | Jan. 23, 1945 |
| 2,669,065 | Clegg | Feb. 16, 1954 |
| 2,740,234 | Van Norman | Apr. 3, 1956 |